United States Patent [19]
Dujari et al.

[11] Patent Number: 5,608,853
[45] Date of Patent: Mar. 4, 1997

[54] SYSTEM AND METHOD FOR GRAPHICS SCALING AND LOCALIZED COLOR ENHANCEMENT

[75] Inventors: Rajeev Dujari, Kirkland, Wash.; Beerud D. Sheth, New York, N.Y.

[73] Assignee: Microsoft Corporation, Redmond, Wash.

[21] Appl. No.: 376,008

[22] Filed: Jan. 19, 1995

[51] Int. Cl.⁶ .................................................. G06T 3/00
[52] U.S. Cl. .......................... 395/139; 382/299; 358/451
[58] Field of Search .......................... 395/139, 133–135, 395/126–132, 162–166; 358/448, 455, 456–461, 451; 382/299

[56] References Cited

U.S. PATENT DOCUMENTS 5,231,519  7/1993  Koike ...................................... 358/456

OTHER PUBLICATIONS

Duttweiler (ed.), *Coded Representation of Picture and Audio Information—Progressive Bi-Level Image Compression*, Draft CCITT Recommendation T.82 (ISO/IEC CD 11544), 1991, pp. 4–81.

*Primary Examiner*—Almis R. Jankus
*Attorney, Agent, or Firm*—Seed and Berry LLP

[57] ABSTRACT

A system and method for scaling graphic images determines a local background color on a pixel by pixel basis. The local background color for a particular pixel is determined based on scaled or unsealed pixels in the local area around the particular pixel. The local background color for each pixel can be used to influence the color selection for that pixel. The system can be to increase or reduce resolution. The system can operate with devices that scan horizontally or vertically, and from the left or right.

24 Claims, 5 Drawing Sheets

SYSTEM AND METHOD FOR GRAPHICS SCALING AND LOCALIZED COLOR ENHANCEMENT

TECHNICAL FIELD

The invention relates generally to a system and method for graphics enhancement and, more particularly, to a system and method for selective enhancement in scaling graphic images.

BACKGROUND OF THE INVENTION

The use of graphics in computer applications is very widespread. The transmission of a document between computers or computing devices often includes the transmission of graphic data. This includes the transmission of facsimile messages from one facsimile (FAX) machine to another FAX machine, or the transmission of data from a host computer to a printer. Graphic data may be transmitted in the form of raster graphics in which the graphic image is rendered into a bit-map data file prior to transmission. For example, a FAX machine scans a document and generates a bit-map data file for each page.

Other devices, such as a printer coupled to a host computer, may also transfer graphic data relating to the pages to be printed by the printer. The host computer or the printer will render the graphic data into bit-map data. A common element in all of these examples is that one computer or device sends a graphic image to a second computer or device.

In some situations, the transmitting and the receiving devices may have some incompatibilities. A common incompatibility is that the transmitting and receiving devices do not have the same resolution for displaying or printing graphic images. For example, a typical computer display may have a graphic resolution of 96 pixels per inch, while a typical laser printer has a resolution of 300 pixels per inch. Thus, a graphic image created on the computer display cannot be directly printed on the printer without some form of scaling. Even so called "standard" FAX machines may have incompatible resolutions. The standard transmitting FAX machine may have a graphic image in one resolution while the standard receiving FAX machine may only be able to process graphic images with a different resolution. A FAX interface board in a computer is another FAX machine which may have yet another resolution for its graphic images.

Another common incompatibility is the paper on which graphic images are to be printed. A graphic image may have been created on one size of paper, such as 8½ inch by 14 inch, but will be transmitted to a receiving device that can only process 8½ inch by 11 inch paper even though the transmitting and receiving devices may have the same graphic resolution. To overcome the foregoing incompatibilities, the graphic image must be scaled to a resolution or size that can be processed by the receiving device.

Figure 1A:
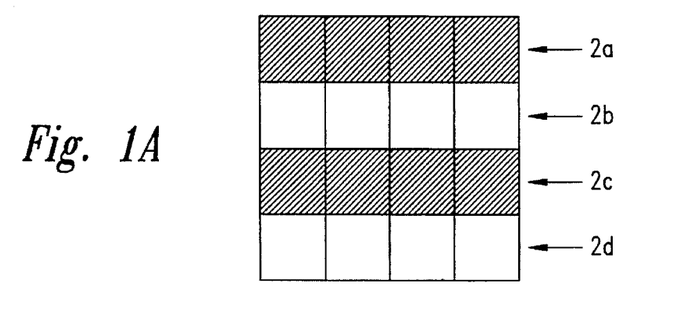
FIG. 1A illustrates a graphic image.
Figure 1B:
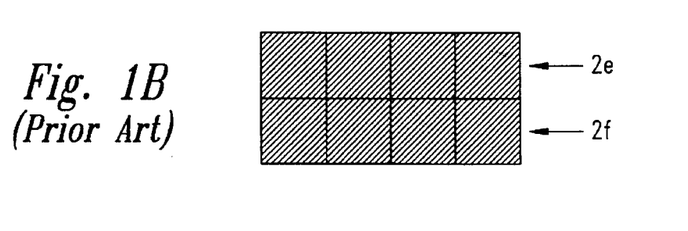
FIG. 1B illustrates the result of prior art processing of the graphic image of FIG. 1A.

There are several scaling procedures well known in the prior art. Some prior art systems scale an image by simply adding or deleting lines to the graphic data. For example a 2:1 reduction in vertical resolution may be easily accomplished by dropping every other line in a graphic image or dropping every other data point. While this approach may result in the desired resolution, it has the undesirable side effect of losing data in an arbitrary manner. FIG. 1A illustrates a graphic image having four horizontal scan rows 2a through 2d. The horizontal scan rows 2a and 2c contain all black pixels, while the horizontal scan rows 2b and 2d contain all white pixels. If a prior art system for scaling graphic images simply drops every other horizontal scan line to implement a 2:1 reduction in resolution, the result is that the all white horizontal scan rows 2b and 2d are dropped resulting in the unacceptable graphic image shown in FIG. 1B where there are two adjacent all black horizontal scan rows 2e and 2f. The graphic scaling of the prior art failed to preserve the diversity of colors present in the unscaled graphic image by simply dropping data bits without regard to the informational content of those data bits.

Some prior art systems perform more sophisticated scaling by emphasizing or selectively enhancing one pixel color over another. These prior art systems assume that a typical monochromatic graphic image is black printed on a white background. Therefore, these prior art systems define white as a background color and black as a foreground color. The general assumption taken by these prior art systems is that the foreground color contains more important data than the background color and is thus favored over the background color. With such a prior art system processing the graphic image data in FIG. 1A, the result would be the same image shown in FIG. 1B because the black pixels in the horizontal scan rows 2a and 2c would be favored and selected over the white pixels in the horizontal scan rows 2b and 2d. While any reduction in resolution will result in an actual loss of data, both of these prior art scaling techniques also lose the diversity of pixel colors, which results in the unacceptable graphic image of FIG. 1B.

Figure 2A:
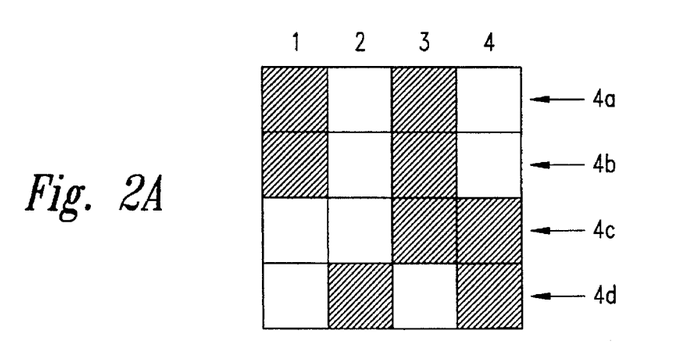
FIG. 2A illustrates a graphic image.
Figure 2B:
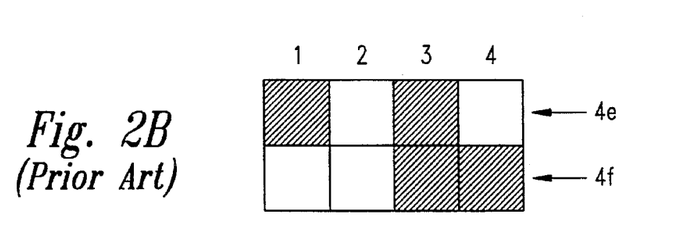
FIG. 2B illustrates the result of processing of the graphic image of FIG. 2A by a first type of prior art system.
Figure 2C:
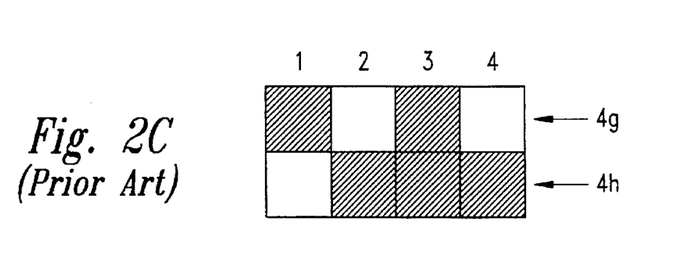
FIG. 2C illustrates the result of processing of the graphic image of FIG. 2A by a second type of prior art system.

As another example of the scaling performed by prior art systems, consider the unscaled graphic image of FIG. 2A in which four horizontal scan rows 4a, 4b, 4c, and 4d will be compressed into two horizontal scan rows. One prior art system deletes alternating horizontal scan rows (i.e., the horizontal scan lines 4b and 4d) regardless of background color, resulting in the unacceptable scaled image of FIG. 2B. In another prior art system that performs 2:1 compression of the graphic image, the pixels in the first line are compared with the corresponding pixels in the second line. Any pixels that have the same color will be compressed into a single pixel of the same color. Thus, the unscaled pixels 1 and 3 in each of the horizontal scan lines 4a and 4b are both black and will be compressed into the scaled black pixels 1 and 3 in the horizontal scan line 4g of the scaled graphic image of FIG. 2C. Similarly, unscaled pixels 2 and 4 in each of the horizontal scan lines 4a and 4b are both white and will thus be compressed into the scaled white pixels 2 and 4 in the horizontal scan line 4g of the scaled graphic image of FIG. 2C. This comparison is then repeated for the remaining pairs of lines in the unscaled image. Because pixels 1 in both of the horizontal scan lines 4c and 4d are white, they will be compressed into the scaled white pixel 1 of the horizontal scan line 4h. Pixels 4 in both of the horizontal scan lines 4c and 4d are black and will be compressed into the scaled black pixel 4 of the horizontal scan line 4h.

Pixels 2 of the horizontal scan lines 4c and 4d of FIG. 2A are white and black, respectively. The prior art system assumes that white is a background color and thus has less informational value than black pixels. Therefore, the prior art system will compress pixels 2 of the horizontal scan lines 4c and 4d into a single scaled black pixel 2 of the horizontal scan line 4h of FIG. 2C. Similarly, pixels 3 of the horizontal scan lines 4c and 4d are black and white, respectively. The prior art system again assumes that white is a background color and will compress pixel 3 of the horizontal scan lines 4c and 4d into a single scaled black pixel 3 of the horizontal scan line 4h. While data is always lost when reducing resolution of a graphic image, the prior art systems also lose additional informational content by making broad assumptions about the background color. If the unsealed graphic image of FIG. 2A were part of a graphic character, for example, the prior art scaled images of FIGS. 2B and 2C have lost the diversity of pixel colors originally contained in pixels 2 and 3 of the horizontal scan lines 4c and 4d of the unscaled image of FIG. 2A. As a result of this loss in diversity, there is a loss of image detail and an undesirably large degradation in the overall image clarity.

In all of the prior art graphic scaling systems, informational content and image detail can be lost because the pixels are scaled without regard to the background color or are scaled using broad assumptions about the background color. In either case, image detail and clarity may be lost in the scaled image by failing to consider the background color for portions of a graphic image. Therefore, it can be appreciated that there has been a significant need for a system and method for scaling graphic images using selective enhancement techniques that permit the retention of image clarity.

SUMMARY OF THE INVENTION

The present invention is embodied in a system and method for the selective enhancement of an unscaled graphic image represented by a plurality of pixels and having a first extent. The system includes a scaler for changing the unsealed graphic image from the first extent to a second extent to define a pixel representation. A background processor analyzes pixels to determine a local background color for a particular pixel in the pixel representation. A pixel processor receives the local background color and determines a pixel color for the particular pixel based on the local background color for that particular pixel.

In one embodiment, the local background color comprises one of two monochromatic colors. The background processor analyzes at least one pixel in the pixel representation located in the proximity of the particular pixel to determine the local background color. The pixel processor may sequentially analyze pixels in the unsealed graphic image in a predetermined direction with the background processor analyzing pixels in the pixel representation in the same predetermined direction to determine the local background color. Alteratively, the background processor may analyze a single pixel in the pixel representation immediately adjacent to the particular pixel in a direction opposite to the predetermined direction to determine the background color.

The inventive method involves scaling the unscaled image from the first extent to a second extent to define a pixel representation. Pixels are analyzed to determine a local background color for a particular pixel in the pixel representation and a pixel color for the particular pixel is selected based on the local background color for the particular pixel.

In one embodiment, the pixels in the unsealed graphic image corresponding to the pixel representation are analyzed to select a single color for a particular one of the pixels in the pixel representation if the corresponding pixels have a single color, and to select a color different from the local background color for the particular pixel if the corresponding pixels do not have a single color.

DETAILED DESCRIPTION OF THE INVENTION

The image data typically processed by the present invention is a raster image, which comprises a sequence of horizontal scan rows. Each horizontal scan row is, in turn, made up of a series of pixels. As can be appreciated, the term "horizontal scan rows" is used with reference to typical devices that scan each row of pixels in a horizontal direction. However, the present invention is equally applicable to devices that may scan in the vertical direction.

Each pixel in the raster image is represented by one or more data bits. In its simplest form, there is a single data bit for each pixel indicating whether the pixel is "colored" or not. As can be appreciated, the term "colored" refers to whether the pixel is visible with respect to a "background color" of the particular display medium. Each particular display medium has a background color such as blue on a video display screen. In this example, pixels have a particular data value that causes the video display to light pixels with a blue color. A "foreground color" refers to pixels that have a different data value than the data value for the background color and are thus visible against the background color of the particular display medium. In the above example, where blue is the background color, yellow may be selected as the foreground color. The present invention is applicable to color displays or monochromatic displays. For example, a typical printer, such as a laser printer has one data bit for each pixel to indicate whether or not the pixel is colored. The pixels have a first data value (i.e., first logic state) if they have the foreground color, such as black, and have a second data value (i.e., a second opposite logic state) if they have the background color, such as white.

A plurality of data bits may be used for each pixel to indicate the intensity of the pixel if the display medium can process gray-scale images or the actual color of the pixel if the particular display medium can process color images. If the particular display is a multi-color display, the background color will have one data value, and the foreground color will have one or more data values different from the data value of the background color. The actual data values of the pixels depend on the particular display medium.

Graphic images may be increased or reduced in resolution to accommodate different data processing capabilities of various graphic image transmitting, processing, and receiving devices. This is particularly useful when communicating with devices such as FAX machines where there are several different resolutions. The standard for facsimile communication have been established by The International Telegraph and Telephone Consultative Committee (CCITT) now known as the International Telecommunications Union—Telecommunications Standards Sector (ITU-T). The CCITT standard will be referred to throughout the present description, and is well understood by those skilled in the art and will not be discussed in detail herein. The CCITT standard defines at least two different resolutions that may be used with a Group 3 FAX machine. A Group 3 FAX machine has either a 200×200 resolution (i.e., 200 pixels per inch by 200 pixels per inch) or a 200×100 resolution (i.e., 200 pixels per inch by 100 pixels per inch). A transmitting Group 3 FAX machine polls the capabilities of a receiving FAX machine and, for example, if the transmitting FAX machine has a 200×200 resolution and the receiving FAX machine has only a 200×100 resolution, the transmitting FAX machine will reduce the resolution of the image data prior to transmitting the facsimile message. The term "extent" is sometimes used rather than resolution when referring to a pixel array. The term "extent" is defined herein as resolution times size. For example, at 200×100 resolution, a 4"×4" graphic image would have an 800×400 extent (200 pixels/inch×4 inches= 800 pixel extent and 100 pixels/inch×4 inches=400 pixel extent). This means that an 800×400 pixel array is required to represent the 4"×4" image at the specified resolution. At a higher resolution, the 4"×4" image has a correspondingly higher extent.

To more easily accommodate the scaling of graphic images between devices, the present invention provides a technique that provides greater retention of image detail and better image clarity than was possible in the prior art by maintaining greater diversity of colors in the scaled image. The present invention maintains the diversity of colors in the scaled image by selectively emphasizing or enhancing foreground colors on a pixel-by-pixel basis. The present invention uses selective enhancement of graphic images, but does not make the broad assumption of the prior art that white is a background color and black is a foreground color which is favored in the construction of the scaled image. The default background color in the present invention is white, but other colors can be selected as the background color for an entire page. However, as will be discussed below, the present invention determines background colors for portions of a page.

While the present invention typically favors the foreground color over the background color, the background color is determined on a pixel by pixel basis and is not assumed to be white. This permits far more sophisticated selective enhancement than was possible in the prior art. The selective enhancement of the present invention provides several advantages over the prior art, as will be seen below. Further, the present invention can be easily implemented on any computer system. While the examples presented herein are related to facsimile transmission, those skilled in the art will appreciate that the principles of the present invention are equally applicable to any computer system that requires an alteration in the resolution of a graphic image. One such example is a graphic computer system that processes a graphic image in one resolution and prints the graphic image on a printer, such as a laser printer, that has a different resolution.

Figure 3:
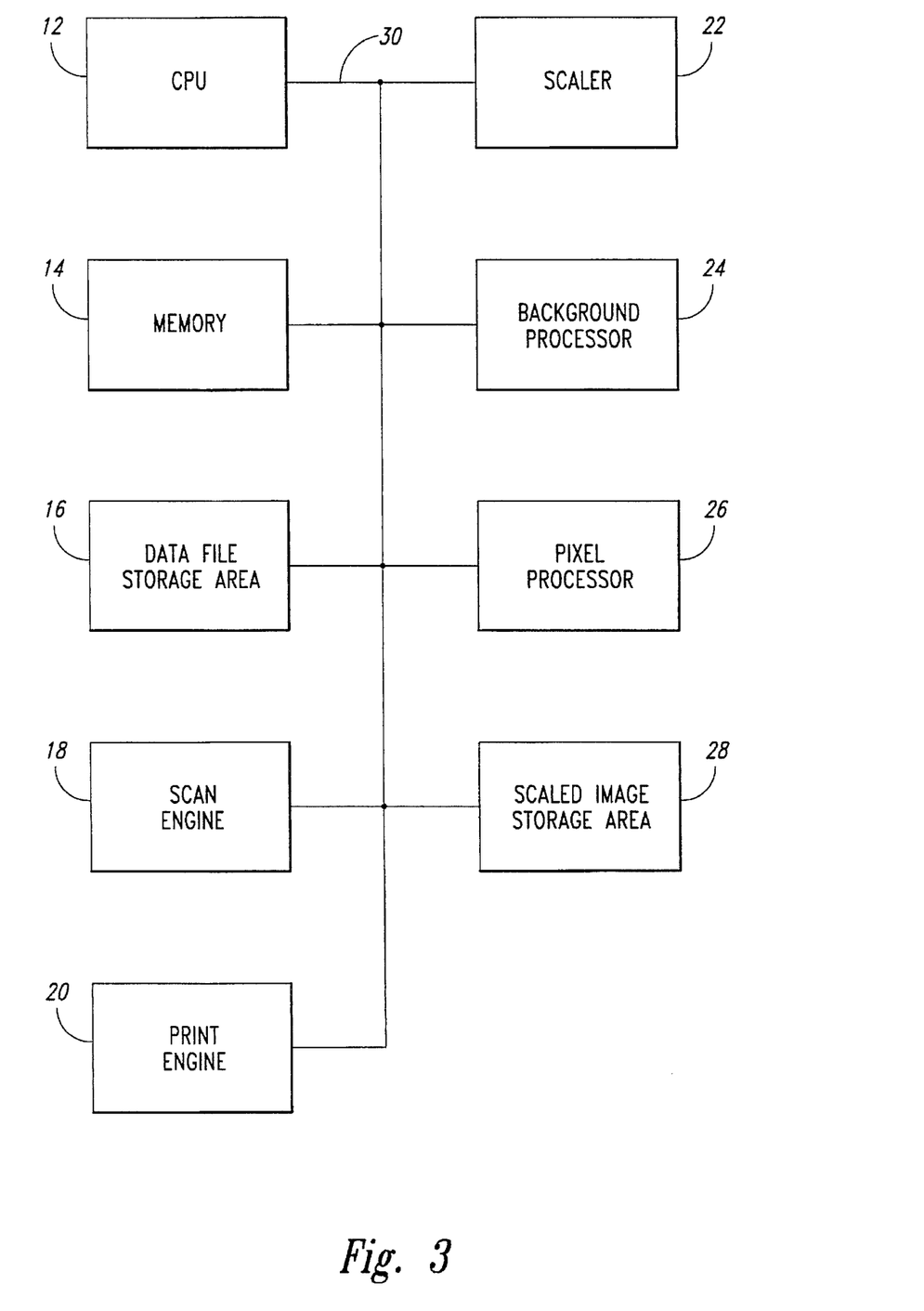
FIG. 3 is a functional block diagram of the system of the present invention.

The present invention is embodied in a system 10 shown in functional block diagram form in FIG. 3. The system 10 includes a central processor (CPU) 12 and a memory 14, which may comprise both random access memory (RAM) and read-only memory (ROM). The memory 14 is included with program instructions that are executed by the CPU 12 to control various aspects of the operation of system 10, including the selective enhancement of graphic images described below. An unsealed graphic image data file, having a first extent, is stored in a data file storage area 16. The data file storage area 16 may be part of the memory 14 or other convenient location such as a disk drive (not shown). The unsealed graphic image data may also be entered into the system 10 using a scan engine 18, as would be common if the system 10 were incorporated into a FAX machine. A print engine 20 may also be included in the system 10. The print engine 20 may be an integral part of the system 10, as would be common if the system were incorporated into a FAX machine. Alternatively, the print engine 20 may be a printer attached to the system 10 using an interface cable, as would be common if the system is part of a standalone computer such as a personal computer.

A scaler 22 operating in accordance with the present invention processes the image data in the data file storage area 16 to scale the image data from the first extent to a second extent. The system 10 determines a local background color for each pixel of the scaled image. The local background color is defined as the background color for a small predetermined area, such as one or more pixels. The local background color for a particular pixel is determined by analyzing pixels surrounding the particular pixel. A background processor 24 determines the local background color for each pixel in the scaled image. The background processor 24 can use the unsealed image data in the data file storage area 16 or the scaled image data to determine the local background color.

A pixel processor 26 receives the data from the background processor 24 and uses the local background color information to determine whether a particular pixel in the scaled image will have a foreground or background color. The details of operation of the scaler 22, the background processor 24, and the pixel processor 26 are provided below. The scaled and processed image data is stored in a scaled image storage area 28, which may be part of the memory 14. The portions of the system 10 described above are interconnected by a bus 30. The bus 30 may carry power and control signals as well as data signals between the various portions of the system 10.

It should be noted that in some embodiments of the system 10, local background color is irrelevant because a portion of the image has only one color. For example, if the unscaled graphic image has a large area of all black pixels, the scaled image should have a corresponding area of all black pixels without regard to local background color. For example, if the system 10 is compressing a graphic image by a factor of 2:1 and two pixels to be compressed have the same color, that color is maintained regardless of the local background color. Thus, the local background color is irrelevant for that particular pixel. Similarly, if a graphic image is to be increased in resolution by a factor of 2:1, and two unscaled pixels have the same color, the four scaled pixels will also have the same color as the unscaled pixels regardless of the local background color. This permits the scaled graphic image to appear nearly identical to the unsealed image. The pixel processor 26 need only use the local background color information in situations where the scaled data pixel could be more than one color, as might occur in a graphic image at an edge of a graphic character or table. In that case, the local background color for the particular pixel is used by the pixel processor 26 in order to emphasize the foreground color for that particular pixel. The result is a greater retention of color diversity and thus image detail than was possible in the prior art.

Figure 4A:
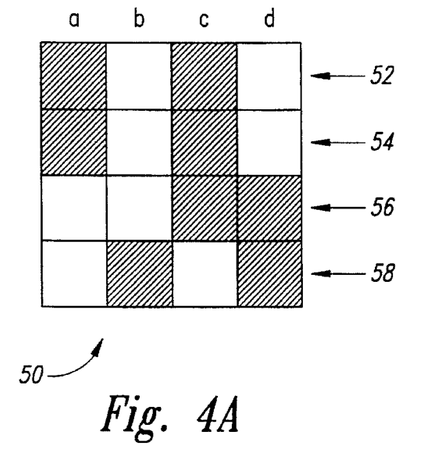
FIG. 4A illustrates the graphic image of FIG. 2A.
Figure 4B:
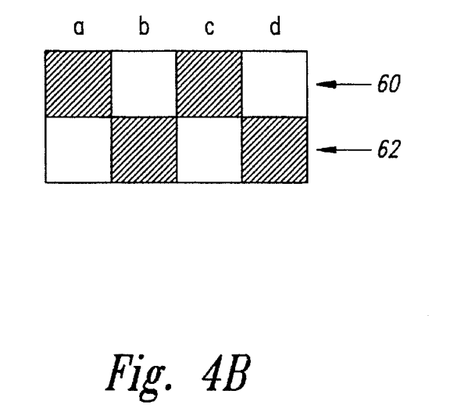
FIG. 4B illustrates the result of processing of the graphic image of FIG. 4A using the inventive system of FIG. 3.

The operation of the system 10 is illustrated in FIGS. 4A and 4B. An unsealed portion 50 of a graphic image comprises four horizontal scan rows 52, 54, 56 and 58 in FIG. 4A. Note that unscaled graphic image of FIG. 4A is identical to the unscaled graphic image of FIG. 2A, which was processed into scaled images of FIGS. 2B and 2C by various systems of the prior art. The scaler 22 scales the graphic image data from the original extent to the desired extent. Note that scaling can include compression, expansion, or both if the graphic image is being compressed in one dimension and expanded in another dimension. The scaler 22 operates by deleting pixels from the unscaled image or by adding pixels to the unsealed image to achieve the desired extent. For example, if the system 10 is reducing the extent of the image data by a factor of two in the vertical direction (i.e., 2:1 reduction in resolution), the scaler 22 will compress the four horizontal scan rows 52, 54, 56 and 58 into two horizontal scan rows. The scaler 22 will double the number of horizontal scan rows if the unsealed image is being expanded by a factor of 1:2. The scaler 22 increases the number of pixels by one half if the unsealed image is being expanded by a factor of 2:3. Thus, it can be seen that the system 10 can effectively scale a graphic image by any integer ratio. The present invention is intended to encompass any and all techniques for scaling a graphic image from one extent to another extent.

The color of the individual pixels in the scaled image will be determined by the background processor 24 and the pixel processor 26. As previously discussed, prior art systems would produce a 2:1 reduction in resolution by simply dropping every other horizontal scan line or emphasizing black pixels over white pixels without any further analysis of individual pixels resulting in the scaled graphic images of FIGS. 2B and 2C, respectively.

In contrast, the pixel processor 26 of the present invention processes the horizontal scan rows using the data from the background processor 24 to select the pixel color of each pixel in the scaled graphic image. There are numerous techniques for determining the pixel color for the scaled graphic image. For example, the pixel processor 26 of the presently preferred embodiment selectively enhances the foreground color over the background color on a pixel by pixel basis. The system 10 can scale in either the horizontal direction, the vertical direction, or both. While the examples presented herein illustrate vertical scaling starting from the top of a graphic image, the vertical scaling could also be performed from the bottom of a graphic image to the top by reversing the process described herein. Similarly, horizontal scaling can be performed by the system 10 starting at the left or the right side of the graphic image and applying the same logic as used for vertical scaling.

The CCITT standard defines an imaginary row of all white pixels at the top of each page of a graphic image and an imaginary column of all white pixels at the left side of each graphic image. These imaginary white pixels are used for the CCITT data encoding process. Similarly, the system 10 defines an imaginary row of all white pixels at the top of the graphic image to establish a predetermined local background color for the first horizontal scan row (assuming that the image data is being processed from top to bottom). The system 10 further defines an imaginary column of all white pixels at the left side of the graphic image to establish the predetermined local background color for horizontal scaling (assuming that the image data is being processed from left to right).

The background processor 24 determines the local background color for the pixels in the scaled image. In the presently preferred embodiment, the background processor 24 analyzes the scaled image in the scaled image storage area 28 (see FIG. 3) to determine the local background color. However, those skilled in the art will recognize that the background processor could analyze the unsealed graphic image in the data file storage area to determine the local background color. Alteratively, the background processor could determine local background color based on a combination of the unsealed graphic image and the scaled graphic image. The present invention is not limited by the manner in which the background processor 24 determines the local background color.

The two horizontal scan rows 52 and 54 are identical in the example of FIG. 4A. Because the pixels 52a to 52d are identical to the corresponding pixels 54a to 54d, typically there is no need to consider the local background color for any of the pixels 60a to 60d when processing the 2:1 vertical scaled image shown in FIG. 4B. The local background color is irrelevant because the two black pixels 52a and 54a should be compressed into one black pixel and two white pixels 52b and 54b should be compressed into one white pixel to avoid the loss of information when compressing the image data in a lossy fashion such as by the deleting of pixels typically used for scaling of graphic images. Therefore, the black pixels 52a and 54a of FIG. 4A are compressed to a single black pixel 60a in FIG. 4B. The white pixels 52b and 54b of FIG. 4A are compressed to a single white pixel 60b in FIG. 4B. Similarly, the black pixels 52c and 54c are compressed to a single black pixel 60c, and the white pixels 52d and 54d are compressed to a single white pixel 60d. Alternatively, the background processor 24 can determine a local background color even when the pixels of the unsealed or scaled image have a single color.

The first pixel 56a and 58a in the horizontal scan rows 56 and 58, respectively, are both white in the example of FIG. 4A. As discussed above, there is no need to consider the local background color in this situation. Therefore, the white pixels 56a and 58a are compressed to a single white pixel 62a in FIG. 3C. Similarly, the two black pixels 56d and 58d are compressed into a single black pixel 62d in FIG. 4B.

The two pixels 56b and 58b in the horizontal scan rows 56 and 58, respectively, are white and black. Because the unsealed pixels have different colors, the local background color must be determined in order to designate the color of the scaled pixel 62b in FIG. 4B as white or black. In the presently preferred embodiment, the background processor 24 (see FIG. 3) determines the local background color of the scaled graphic image when analyzing the pixels 56b and 58b by designating, for example, the color of the pixel 60b directly above in the scaled image as the local background or reference color for the pixel 62b, which corresponds to the pixels 56b and 58b. Because the pixel 60b is white, white is defined as the background color, and the pixel 62b is designated as black in order to preserve the foreground color over the local background color. The system performs a similar analysis when compressing the black pixel 56c and the white pixel 58c into a single scaled pixel 62c. Because the pixel 60c above is black, black is defined as the background color, and the pixel 62b is designated as white in order to preserve the foreground color over the local background color. This approach, called selective enhancement, preserves a greater amount of image detail than prior art systems even though there is an identical loss of data.

The presently preferred embodiment of the system 10 analyzes a previously scaled pixel to determine the local background color for the pixel currently being analyzed. By examining the scaled image to determine the local background color, the system 10 maintains greater color diversity. For example, if the previously scaled pixel selected by the background processor 24 is a black pixel, black is defined as the local background color for the current pixel. This causes white to be selected for the current pixel if there is a choice to be made between the two colors. As will be appreciated by those skilled in the art, there are numerous techniques that can be employed to determine the local background color, such as analyzing several previously scaled pixels and selecting a majority color for the local background color. Thus, the present invention is not limited by the specific number or position in the graphic image of pixels used to determine the local background color. All such techniques for maintaining the diversity of colors in the scaled graphic image are contemplated by the inventor.

For the sake of simplicity, the examples above use two colors (i.e., black and white) as the only color choices. However, the system 10 is equally applicable to full color and greyscale systems where each pixel is defined by a plurality of data bits representing intensity and color. For example, assume that a computer display is a greyscale display having a greyscale intensity range of 0 to 255 for each pixel. If there is a two-to-one decrease in resolution, and two pixels are scaled into a single pixel, the intensity values of the two pixels can be averaged and used as the intensity value for the scaled pixel. However, if the two pixels being compressed have intensity values of 0 and 255, respectively, the scaled pixel will have an average intensity value of 127.5 if the two intensity values are simply averaged. The system 10 can only represent the pixel using whole numbers and thus must assign an intensity value of either 127 or 128 to the scaled pixel. If the local background color has an intensity value of 25, which is in the lower half of the range, then the intensity value of 127 would be considered the local background color for the scaled pixel. The scaled pixel would then be designated as having an intensity value of 128 in order to selectively enhance the foreground intensity over the local background intensity. Thus, the system 10 typically enhances the foreground color over the local background color. As stated above, there are situations, such as when the unsealed pixels have the same color or intensity, when the local background color will not affect the selective enhancement process.

Figure 5A:
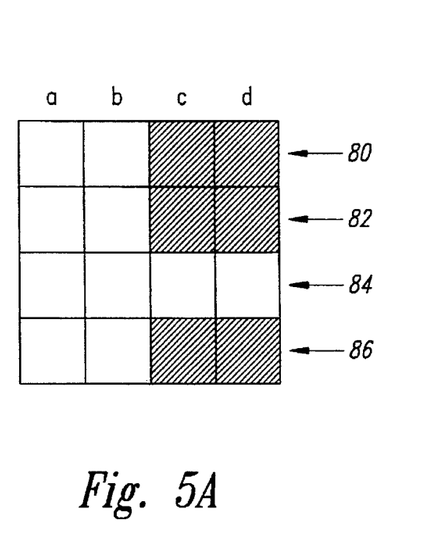
FIG. 5A illustrates a graphic image.
Figure 5B:
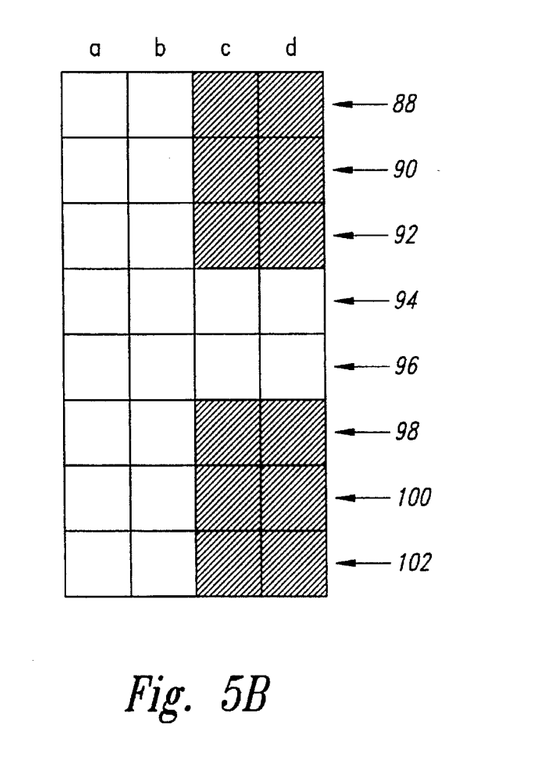
FIG. 5B illustrates the result of processing of the graphic image of FIG. 5A using the inventive system of FIG. 3.

The system 10 also preserves information content using selective enhancement when a graphic image is scaled upward. For example, a transmitting FAX machine may have a resolution of 200×100 and a receiving FAX machine has a resolution of 200×200. The operation of the system 10 to increase the resolution of the graphic image is illustrated in FIGS. 5A and 5B. The unscaled graphic image, shown in FIG. 5A, comprises four horizontal scan rows 80, 82, 84, and 86. As previously discussed, the prior art scales such an image by simply repeating every line to double the resolution of the graphic image.

In contrast, the system 10 processes the graphic image by scaling and then analyzing the background color of each of the extra pixels introduced as a result of scaling the image. For example, the two unsealed black pixels 80*d* and 82*d* will be scaled into four pixels 88*d*, 90*d*, 92*d*, and 94*d*, shown in FIG. 5B. The scaled pixels 88*d* and 92*d* correspond to the black pixels 80*d* and 82*d* and are thus black. The scaled pixel 90*d* is an extra pixel introduced as a result of scaling the graphic image of FIG. 5A. As with scaling by decreasing resolution, the system 10 need not consider the background color when the unsealed pixels have the same color. Because the unsealed pixels 80 and 82 in FIG. 5A are both black, any extra pixel introduced by the scaling process could have the same color as the pixels surrounding it. Therefore, there is no need to analyze the background color of the scaled pixel 90*d* that is introduced as a result of scaling the image of FIG. 5A. Thus, the pixels 88*d*, 90*d*, and 92*d* are all black pixels, as seen in FIG. 5B. The scaled pixel 88*d* corresponds to the pixel 80*d* in FIG. 5A, the scaled pixel 92*d* corresponds to the pixel 82*d*, and the scaled pixel 90*d*, which is the extra pixel introduced as a result of scaling, is also designated as a black pixel because the pixels 80*d* and 82*d* in the unsealed image of FIG. 5A are also black.

In situations where there is a choice of colors, such as when an unsealed black pixel is followed by an unsealed white pixel, the system 10 determines a local background color for the scaled pixel added as a result of the scaling. The black scaled pixel 92*d* in FIG. 5B corresponds to the black pixel 82*d* in FIG. 5A, and the white scaled pixel 96*d* corresponds to the white pixel 84*d*. Because the black pixel 82*d* is followed by a white pixel 84*d*, the system 10 determines a local background color for the extra scaled pixel 94*d* that is introduced as a result of scaling of pixel 82*d*. The extra scaled pixel 94*d* is not merely the repetition of unsealed pixel 82*d*, as is done in the prior art. Instead the background processor 24 (see FIG. 3) examines, for example, the three scaled pixels 88*d*, 90*d*, and 92*d* and selects the majority color as the local background color for the scaled pixel 94*d*. If only one scaled pixel 92*d* were used to determine the local background color, the system 10 would end up merely repeating the horizontal scan rows in the same manner as the prior art. As seen in FIG. 5B, the three previous scaled pixels 88*d*, 90*d*, and 92*d* are all black. Therefore, the color black is defined as the local background color for the scaled pixel 94*d*. Therefore, the foreground color white will be selectively enhanced. Thus, the pixel 94*d* in FIG. 5B is designated as a white pixel.

The scaled pixel 96*d* in FIG. 5B corresponds to the white pixel 84*d* in the unsealed image of FIG. 5A. Because the following pixel 86*d* in the unsealed image of FIG. 5A is a black pixel, the system 10 must determine a local background color for the scaled pixel 98*d*. The background processor 24 analyzes the three previous scaled pixels 92*d*, 94*d*, and 96*d* in FIG. 5B to determine the local background for the scaled pixel 98*d*. As seen in FIG. 5B, the color for the three previous scaled pixels 92*d*, 94*d*, and 96*d* is black, white, and white, respectively. Because two of the three previous scaled pixels 92*d*, 94*d*, and 96*d* are white, the color white is the majority color and is defined as the local background color for the scaled pixel 98*d*. The system 10 will selectively enhance the foreground color black over the local background color for the scaled pixel 98*d*. Thus, the scaled pixel 98*d* in FIG. 5B is designated as a black pixel. This process is repeated for each extra pixel introduced as a result of scaling when there is a need to determine a local background color.

The system 10 can also be used with virtually any integer scaling ratio. As can readily be appreciated, it is not possible to scale to non-integer values because devices such as computers, printers, and the like, can only process discrete pixels, and not partial pixels. However, the system 10 can perform scaling, such as 3:2 scaling, as may be common when transmitting an image scaled for a typical laser printer (with 300×300 resolution) on a standard FAX machine (with 200×200 resolution).

As previously discussed, the local background color may be irrelevant if the unsealed graphic image has a series of pixels of the same color since the scaled pixel will have that same color. However, the background processor 24 can still make such a determination. The present invention is not limited only to situations where pixels have different colors. In the example of a 3:2 compression, three pixels will be scaled to two pixels. If the three pixels in the unsealed image are all the same color, such as black, the two resulting scaled pixels should also be black in order to preserve the clarity of the scaled image. Thus, there is no need to determine a local background color. In any situation where a series of unsealed pixels have the same color, the system 10 will designate the scaled pixels as having the same color as the unsealed pixels. Alternatively, the system 10 could designate the scaled pixels as having different colors in order to enhance the quality of the scaled image. In the example of 1:2 expansion, shown in FIG. 5A and FIG. 5B, there is no need to determine local background color for pixel 90*d* in FIG. 5B because that pixel is the extra scaled pixel between two black pixels 80*d* and 82*d* in the unsealed image of FIG. 5A. However, there is a need to determine local background color for pixel 94*d* because that pixel is the extra scaled pixel between black and white pixels 82*d* and 84*d*, respectively, in the unsealed image of FIG. 5A.

In other situations, the system 10 will attempt to preserve color diversity regardless of the local background color. In the example of 3:2 compression discussed above, the system 10 attempts to preserve both foreground color and background color to maintain greater diversity of colors in the scaled graphic image when three unscaled pixels have different colors. For example, when the three unsealed pixels include two adjacent pixels of the same color, such as black, and a third pixel having a different color, such as white, the system 10 preserves both colors and designates the two scaled pixels as black and white, respectively. If the three pixels in the unscaled image are white, white, black, the system 10 again preserves both colors and designates the two scaled pixels as white and black, respectively. Thus, the system 10 preserves the clarity of the image by preserving the colors to the greatest extent possible. In these situations, both colors are preserved regardless of the local background color.

However, when the three unscaled pixels have alternate colors, such as white, black, white, the system 10 must determine the local background color. In this example, one of the two scaled pixels will be white and one of the scaled pixels will be black, and the local background color will be used to determine the color for each scaled pixel. If the local background color of the first scaled pixel is determined to be black, the two scaled pixels will be designated as white and black, respectively. The first scaled pixel is designated as white because the local background color for that pixel was black, and the system 10 selectively enhances the foreground color. On the other hand, if the local background color in this example is determined to be white, the two pixels in the scaled image would be designated as black and white, respectively. The system 10 preserves the image clarity by maintaining the diversity of colors in the scaled pixels even when data is lost. It will be appreciated by those skilled in the art that other techniques can be used to selectively enhance the foreground color in the scaled image. For example, different scaling factors, such as 4:3 compression, will result in different criteria for selecting the colors of the scaled pixels. However, the principles of the present invention can be applied to selectively enhance the foreground color to maintain the various colors in the scaled pixels.

Figure 6A:
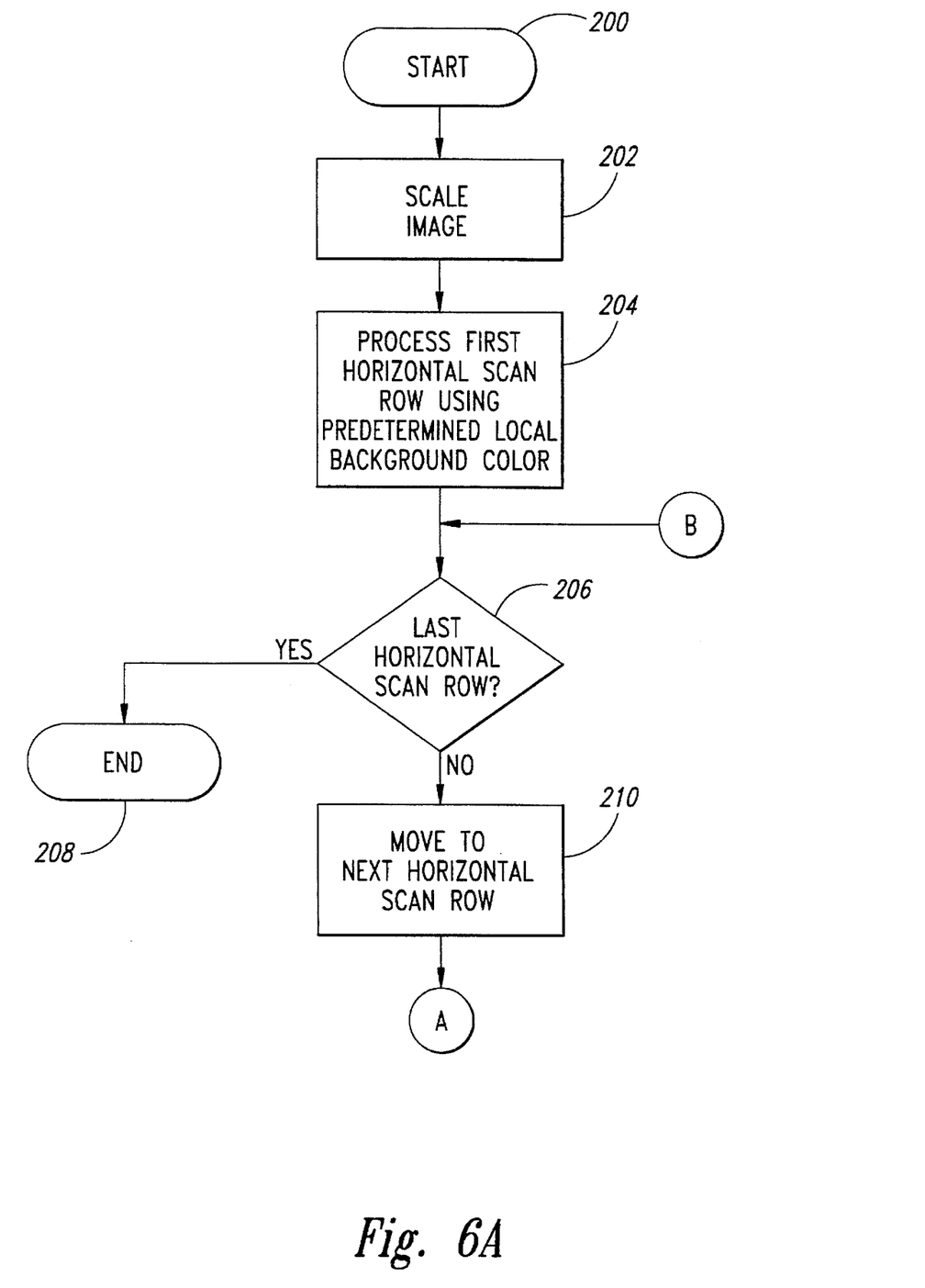
FIG. 6A is a flow chart of the operation of the inventive system of FIG. 3.
Figure 6B:
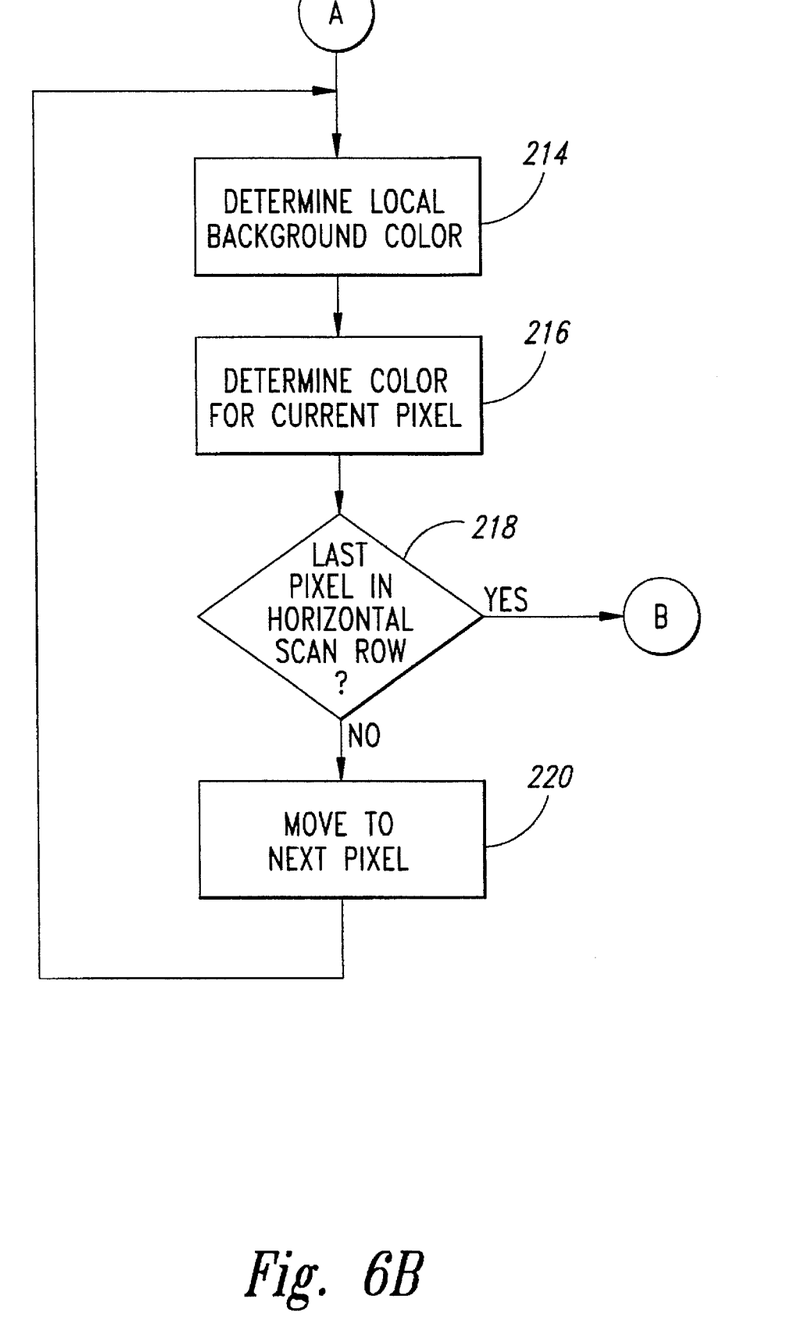
FIG. 6B is a continuation of the flow chart of FIG. 6A.

The process of selective enhancement is shown in the flowcharts of FIGS. 6A and 6B. At the start 200 in FIG. 6A, the system 10 has an unscaled image in the data file storage area 16 (see FIG. 3). In step 202, the scaler 22 (see FIG. 3) scales the image to the desired extent. The scaling performed by the scaler 22 depends on the initial extent of the graphic image and the desired extent of the scaled graphic image. For example, for the 2:1 compression discussed above, the scaler 22 will halve the number of pixels of the unsealed image to generate the scaled image. If the image is being scaled upward, such as by a 1:2 expansion of the unsealed graphic image, the scaler 22 will double the number of pixels in the scaled graphic image. In step 204, the system 10 determines the colors of all the pixels in the first horizontal scan row and establishes a predetermined local background color. As previously discussed, the system 10 defines an imaginary row of all white pixels at the top of the graphic image as a predetermined local background color for vertical scaling and an imaginary column of all white pixels at the left side of the graphic image as the predetermined local background color for horizontal scaling. Thus, the system 10 begins processing the image data using white as the predetermined local background color. Alternatively, other colors or intensities could be used as the predetermined local background.

In decision 206, the system 10 determines whether the horizontal scan row is the last horizontal scan row in the image. If the horizontal scan row is the last row in the image, the result of decision 206 is YES and the system 10 ends the process in step 208. If the horizontal scan line is not the last scan line in the image, the result of decision 206 is NO. In that event, the system 10 moves to the next horizontal scan row in step 210.

In step 214, shown in FIG. 6B, the background processor 24 determines the local color for the current scaled pixel. The pixel processor 26 determines a color for the current scaled pixel in step 216 using the rules described above for specific scaling ratios. Because any integer scaling ratio can be used by the system 10, the general rule for determining a local background color is that one or more scaled pixels are analyzed, and the local background color is the color of the majority of the scaled pixels used in the local background color analysis. As previously discussed, there may be situations, such as a large area with a single color, where the background processor 24 does not need to determine a local background color.

If a local color has been determined for the current pixel, the system 10 selectively enhances the foreground color for the current pixel. In decision 218, the system 10 determines whether the current pixel is the last pixel in the horizontal scan row. If the current pixel is not the last pixel in the horizontal scan row, the system in step 220 moves to the next pixel, and returns to decision 212 to process the pixel. If the current pixel is the last pixel in the horizontal scan row, the result of decision 218 is YES. In that event the system 10 returns control to decision 206, shown in FIG. 6A.

It should be noted that the process for vertical scaling and horizontal scaling are identical with the exception of the pixels used to determine the local background color. If the system 10 is performing vertical scaling, the pixels above the current pixel are used to determine the local background color, assuming that the image data is processed from top to bottom. If the image data is being processed from bottom to top, the pixels below the current pixel are used to determine the local background color. If the system is performing horizontal scaling, the pixels to the left of the current pixel are used to determine the local background color, assuming that the image data is being processed from left to right. If the image is being processed from right to left, the pixels to the right of the current pixel are used to determine the local background color. Alternatively, one or more pixels in the local area of the scaled or unscaled graphic image surrounding a particular pixel can be used to determine the local background color for that particular pixel. The system 10 is not limited by the particular pixels used to determine the local background color.

The examples presented above all illustrate the use of the system 10 for scaling in the vertical direction. As discussed above, vertical scaling may use the system 10 for scaling from top to bottom, as illustrated in the example, or from bottom to top by analyzing pixels below the current pixel to determine a local background color. In addition to vertical scaling, the system 10 may be used for scaling in the horizontal direction by analyzing pixels to the left or right of the current pixel to determine the local background color for the current pixel. As can be appreciated, the system 10 may be used to scale in both the vertical and horizontal directions by independently analyzing the unscaled image to scale in each direction. Alternatively, the system can analyze bit-map regions rather than horizontal or vertical scan lines. This may be used when a graphic object is contained within a small region of a bit-map. In this situation, the scaler 22 scales the bit-map region, and the background processor 24 determines the local background color for pixels in the bit-map region. The pixel processor 26 determines the color for the pixels in the scaled bit-map region using the data from the background processor 24 in the manner previously described.

It should also be noted that the examples presented above selectively emphasize the foreground color over the local background color. However, as those skilled in the art can readily appreciate, the system 10 also makes it possible to emphasize the background color. For example, when the user wishes to change the contrast of a gray-scale image, the system 10 may emphasize the background color. Thus, the present invention is not limited to the selective enhancement of foreground color only.

Similarly, the examples presented above determine the local background color only when pixels have differing colors. However, those skilled in the art will readily appreciate that the system 10 can determine the local background color for each pixel depending on the particular application. For example, if three pixels in a gray-scale image all have the same color, the system 10 can determine the local background color for each pixel if the user wishes to alter the contrast. Thus, the system 10 offers the user the ability to emphasize or de-emphasize the foreground color to fit the particular needs of the user. The system 10 has the flexibility to optimize image scaling to selectively enhance the image in a manner determined by the user.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the selective enhancement of an unscaled graphic image represented by a plurality of pixels having a first extent, the system comprising:

a scaler for changing the unscaled graphic image from the first extent to a second extent to define a pixel representation having at least one pixel;

a background processor for analyzing pixels to determine a local background color for said at least one pixel; and a pixel processor to receive said local background color and to determine a color different from said local background color for said at least one pixel.

2. The system of claim 1 wherein said second extent is less than the first extent, said scaler deleting a portion of the plurality of pixels to define said pixel representation.

3. The system of claim 1 wherein said second extent is greater than the first extent, said scaler adding at least one pixel to the plurality of pixels to define said pixel representation.

4. The system of claim 1 wherein said local background color comprises one of two monochromatic colors.

5. The system of claim 1 wherein said background processor analyzes at least one pixel in said pixel representation located in proximity with said at least one pixel to determine said local background color.

6. The system of claim 1 wherein said pixel processor sequentially analyzes pixels in the unscaled graphic image in a predetermined direction, and said background processor analyzes pixels in said pixel representation in said predetermined direction to determine said local background color.

7. The system of claim 6 wherein said background processor analyzes at least one pixel in said pixel representation located in proximity with said at least one pixel to determine said local background color.

8. The system of claim 6 wherein said background processor analyzes a single pixel in said pixel representation immediately adjacent to said at least one pixel in a direction opposite to said predetermined direction to determine said local background color.

9. A system for scaling a graphic image represented by a plurality of pixels having a first extent, the system comprising:

a scaler for changing the graphic image from the first extent to a second extent to define a pixel representation;

a background processor for analyzing pixels to determine a local background color for a particular pixel in said pixel representation; and a pixel processor receiving said local background color and determining a pixel color for said particular pixel different from said local background color for said particular pixel.

10. The system of claim 9 wherein said local background color comprises one of two monochromatic colors.

11. The system of claim 9 wherein said background processor analyzes at least one pixel in said pixel representation located in proximity with said particular pixel to determine said local background color.

12. The system of claim 9 wherein said background processor analyzes at least one pixel in the plurality of pixels representing the graphic image to determine said local background color.

13. The system of claim 9 wherein said pixel processor sequentially analyzes pixels in the unscaled graphic image in a predetermined direction, and said background processor analyzes pixels in said pixel representation in said predetermined direction to determine said local background color.

14. The system of claim 13 wherein said background processor analyzes at least one pixel in said pixel representation located in proximity with said particular pixel to determine said local background color.

15. The system of claim 13 wherein said background processor analyzes a single pixel in said pixel representation immediately adjacent to said particular pixel in a direction opposite to said predetermined direction to determine said local background color.

16. A method for scaling a graphic image represented by a plurality of pixels having a first extent, the method comprising the steps of:

scaling the graphic image from the first extent to a second extent to define a pixel representation;

analyzing pixels to determine a local background color for a particular pixel in said pixel representation; and selecting a pixel color for said particular pixel different from said local background color for said particular pixel.

17. The method of claim 16 wherein said step of selecting analyzes pixels in the unscaled graphic image corresponding to each pixel in said pixel representation to select said pixel color for said particular pixel if said corresponding pixels each have said pixel color, and to select said pixel color different from said local background color for said particular pixel if said corresponding pixels do not each have said pixel color.

18. The method of claim 16 wherein said second extent is less than the first extent and said step of scaling deletes a portion of the plurality of pixels to define said pixel representation.

19. The method of claim 16 wherein said second extent is greater than the first extent and said step of scaling adds at least one pixel to the plurality of pixels to define said pixel representation.

20. The method of claim 16 wherein said local background color comprises one of two monochromatic colors.

21. The method of claim 16 wherein said step of selecting analyzes at least one pixel in said pixel representation located in proximity with said particular pixel to determine said local background color.

22. The method of claim 16 wherein said step of selecting sequentially analyzes pixels in the unscaled graphic image in a predetermined direction, and said step of analyzing pixels and determining said local background color analyzes pixels in said pixel representation in said predetermined direction to determine said local background color.

23. The method of claim 22 wherein said step of selecting analyzes at least one pixel in said pixel representation located in proximity with said particular pixel to determine said local background color.

24. The method of claim 22 wherein said step of selecting analyzes a single pixel in said pixel representation immediately adjacent to said particular pixel in a direction opposite to said predetermined direction to determine said local background color.

\* \* \* \* \*

UNITED STATES PATENT AND TRADEMARK OFFICE
CERTIFICATE OF CORRECTION

PATENT NO.   : 5,608,853
DATED        : March 4, 1997
INVENTOR(S)  : Rajeev Dujari et al.

It is certified that error appears in the above identified patent and that said Letters Patent is hereby corrected as shown below:

On title page, item [57] ABSTRACT, in line 4 of the abstract please delete "unsealed" and insert therefor --unscaled--.

Signed and Sealed this

Fifteenth Day of July, 1997

Attest:

BRUCE LEHMAN

*Attesting Officer*    Commissioner of Patents and Trademarks